Jan. 25, 1927.　　　　J. GAISER　　　　1,615,752

NONSKID CHAIN

Filed Jan. 16, 1926

INVENTOR,
John Gaiser,
BY
HIS ATTORNEY

Patented Jan. 25, 1927.

1,615,752

UNITED STATES PATENT OFFICE.

JOHN GAISER, OF CENTERVILLE, OHIO.

NONSKID CHAIN.

Application filed January 16, 1926. Serial No. 81,656.

This invention relates to new and useful improvements in non-skid chains, and more particularly to the type of chain illustrated and described in my Patent No. 1,355,464, dated October 12th, 1920.

It is the principal object of my invention to connect the cross chains of my device by links that are extremely durable and whose gripping contact with the road insures a non-slipping tread for the tire.

Other important and incidental objects will be brought out in the following specification and particularly set forth in the subjoined claims.

Figure 1:
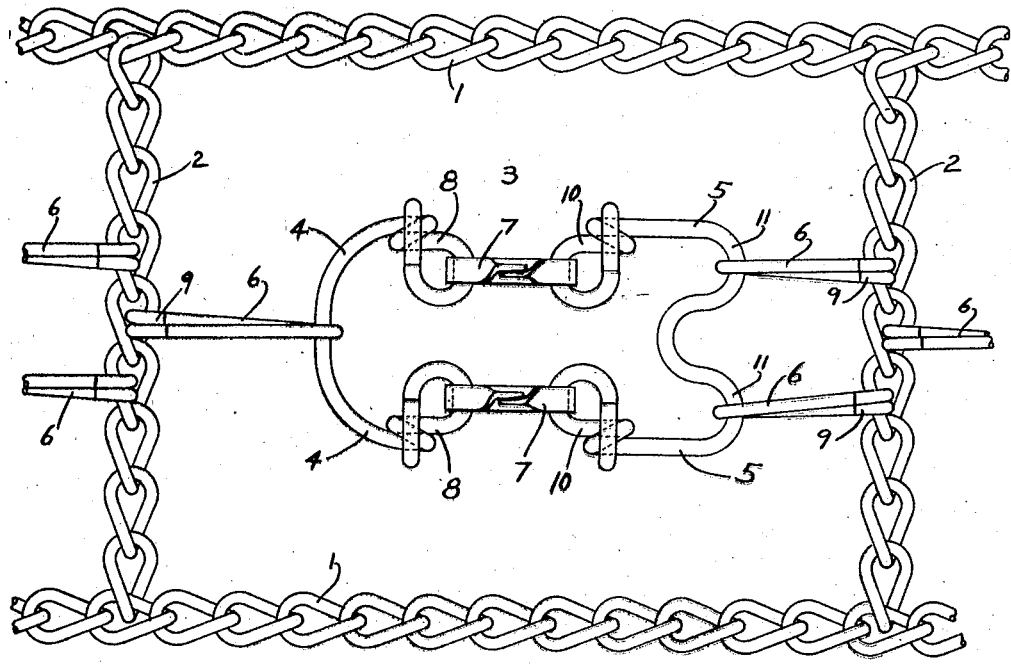
Figure 2:
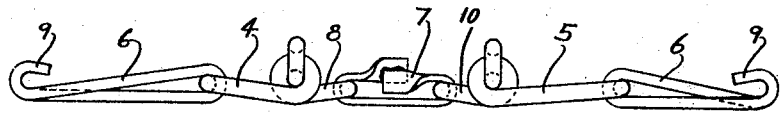

In the accompanying drawings illustrating my invention, Figure 1 is a plan view of a portion of a non-skid chain showing two of the cross chains connected by my improved links. And Figure 2 is an edge view of one of these connecting links detached from the cross chains.

Referring to the accompanying drawings for a detailed description of my invention, the numerals 1, 1 designate two longitudinal chains which surround a tire (not shown) and which are connected around the latter by cross chains 2.

The numeral 3 designates one of my improved links which extend between the cross chains around the tire. Each link consists of two eye members 4 and 5, hooks 6 and central connecting members 7.

The eye member 4 consists of a U-shaped metal element that terminates at each end in an eye knot 8 which forms a projection to engage the surface of slippery roads such as wet or icy ones. Bent around the middle part of the U-shaped member 4 is a hook 6 which preferably consists of a heavy wire whose ends 9 are formed to hook over the links of one of the cross chains 2.

The eye member 5 consists of a U-shaped metal element that terminates at each end in an eye knot 10 to form a projection to engage the surface of wet or icy roads. At its middle portion the U-shaped element 5 is turned inwardly a slight degree to form two end bends 11, 11, each one of which receives the inner end of a hook 6, whose outer ends 9, 9 are hooked over the links of a cross chain 2, with the outer end of the hook 6 of the next link between them as shown in Figure 1.

The eye knots 8 of the member 4 are loosely connected to the eye knots 10 of the member 5 by the central connecting members 7 which preferably comprise heavy metal bands that, after being passed through said eyes, are roughly welded or otherwise secured together to form projections at the middle of the the link to engage the surface of the road over which the tire travels.

The bands 7, 7 form a strong connection between the eye members 4 and 5 and permit them to be easily connected together. The hooks 6 permit the links 3 to be easily, flexibly and firmly connected to the cross chains 2, while the eye members 4 and 5, connected at their eye ends by the metal bands 7, 7, present many jagged edges to the surface of the road over which the tire travels in order that it may not slip thereon. The spaces between these cross chains, and particularly the middle portions of these spaces, are occupied by a wide flexible network of projecting elements which increase the traction between the tire and the road.

I do not wish to be limited to the details of construction and arrangement herein shown and described, and any changes or modifications may be made therein within the scope of the subjoined claims.

Having described my invention, I claim:

1. A construction of the type specified, comprising U-shaped members terminating at their inner ends in knotted eyes, and split metal bands connecting the knotted eyes of said U-shaped members.

2. A construction of the type specified, comprising U-shaped members terminating at their inner ends in knotted eyes, and split metal bands connecting the knotted eyes of said U-shaped members and roughly welded together at their free ends after being passed through said eyes.

3. A construction of the type specified, comprising U-shaped members terminating at their inner ends in knotted eyes, metal eyes connecting the knotted eyes of said U-shaped members, and hooks secured to said U-shaped members for the purpose specified.

In witness whereof I have hereunto set my hand this 13th day of January, 1926.

JOHN GAISER.